United States Patent [19]

Muzyczko et al.

[11] 4,049,746

[45] Sept. 20, 1977

[54] INTERMEDIATE COATING COMPOSITIONS AND LONG RUNNING PLANOGRAPHIC PLATES PREPARED THEREWITH

[75] Inventors: Thaddeus M. Muzyczko, Melrose Park; Ronald A. Frederiksen, Schaumburg; David L. York, Elgin, all of Ill.

[73] Assignee: The Richardson Company, Des Plaines, Ill.

[21] Appl. No.: 606,990

[22] Filed: Aug. 22, 1975

Related U.S. Application Data

[60] Continuation of Ser. No. 455,635, March 28, 1974, abandoned, which is a continuation of Ser. No. 247,205, April 24, 1972, abandoned, which is a division of Ser. No. 97,394, Dec. 4, 1970, Pat. No. 3,690,880.

[51] Int. Cl.$^2$ ............................................. C08L 61/24
[52] U.S. Cl. ........................................ 260/851; 96/33; 96/75; 96/87 R; 260/29.4 UA; 260/70 R
[58] Field of Search .............................. 260/851, 70 R

[56] References Cited

U.S. PATENT DOCUMENTS

| | | | |
|---|---|---|---|
| 2,862,901 | 12/1958 | Suen et al. | 260/851 |
| 2,918,386 | 12/1959 | Wooding | 260/851 |
| 3,329,637 | 7/1967 | Vitalis | 260/851 |
| 3,435,009 | 3/1969 | Sellet | 260/851 |
| 3,509,021 | 4/1970 | Woodward | 260/851 |
| 3,652,479 | 3/1972 | Mogelnicki et al. | 260/851 |
| 3,690,880 | 9/1972 | Muzyczko et al. | 260/70 R |
| 3,715,172 | 2/1973 | Dembowski et al. | 260/851 |
| 3,752,781 | 8/1973 | Muzyczko et al. | 260/70 R |

*Primary Examiner*—John C. Bleutge
*Attorney, Agent, or Firm*—Alan M. Abrams

[57] ABSTRACT

Compositions comprising the reaction product of a novel, highly branched polyalkylenimine-urea-aldehyde resin and a polyacrylic resin provide useful intermediate coatings when applied to preconditioned metal surfaces which may be subsequently coated with light sensitive materials to make photolithographic plates. The intermediate coating, particularly when applied to a grained or ungrained aluminum support member which has been anodized and finally coated with light sensitive materials produces a highly durable plate that possesses good storage characteristics and is capable of unusually extended press runs.

8 Claims, No Drawings

INTERMEDIATE COATING COMPOSITIONS AND LONG RUNNING PLANOGRAPHIC PLATES PREPARED THEREWITH

This is a continuation of application Ser. No. 455,635, filed Mar. 28, 1974 now abandoned which is a continuation of application Ser. No. 247,205 filed Apr. 24, 1972 now abandoned which in turn is a division of application Ser. No. 97,394 filed Dec. 4, 1970 now U.S. Pat. No. 3,690,880.

BACKGROUND OF THE INVENTION

Generally, this invention relates to the preparation of photographic plates for use in planographic printing as well as methods of making the same. More specifically, new and improved intermediate coatings have been developed which may be applied to preconditioned support members by means of a single step bath process prior to the application of a light-sensitive coating.

Intermediate coatings are ordinarily used on lithographic plates to improve bonding or anchoring of light-sensitive materials to support plates and to inhibit any deleterious reaction between the outer photo-sensitive coating and the support member. Besides performing these necessary functions, it has been discovered that the intermediate coatings of the instant invention comprising the reaction product of a novel and highly branched, highly stable polyalkylenimine-urea-aldehyde resin and a polyacrylic resin applied either to a grained or ungrained, anodized or unanodized metallic substrate produces an extremely durable surface which in turn gives a longer running lithographic plate. In addition to their longer running characteristics, the plates of the instant invention may be further distinquished by their substantially extended shelf-life which allows storage for a prolonged period of time prior to use. Such features stand out especially when the coatings are applied to anodized aluminum support members.

The planographic printing plates described herein are not limited solely to the more popular presensitized type plates, but also include the so called wipe-on plates. Under the present invention, a wipe-on plate will consist of the above-mentioned top-coating with the exclusion of the light sensitive resin. In such case, the plate maker applies the light sensitive coating prior to use. On the other hand, a presensitized plate includes the photosensitive coating. In either case, plates of the present invention may be treated in the conventional manner. For example, a plate may be exposed to a carbon arc or a pulsed xenon light source for the appropriate exposure period. The plate can then be developed with one or two step developing lacquers by hand techniques or by developing machines.

Improved planographic printing plates are well known in the graphic arts industry. One such plate is commonly prepared by coating an aluminum sheet with an aqueous solution of an alkali metal silicate. This plate is usually dried and a light sensitive coating, such as a diazo resin is then applied. Upon exposure to light through a stencil or negative, the exposed diazo will form a light-hardened water insoluble hydrophobic surface. The unexposed surfaces may then be removed by an aqueous desensitizer. This plate is described in U.S. Pat. No. 2,714,066 to Jewett et al. Plates of this type, however, unlike those of the present invention are characterized by markedly shorter press runs and diminished shelf-life.

It is also known in the art that anodizing aluminum support members improves corrosion resistance and surface hardness of printing plates. An anodized aluminum printing plate has been described in U.S. Pat. No. 3,181,461 to Fromson. Plates disclosed by Fromson, although exhibiting longer press run qualities than unanodized plates as in Jewett et al. nevertheless fail to provide the unexpected high press runs experienced with preconditioned plates having the intermediate coating as disclosed herein.

The remarkable printing qualities and stability of the plates of the present invention are attributable to the novel polyalkylenimine-urea aldehyde resins employed therein. The abundance of tertiary amino groups in the resin provide a high degree of compatibility with other water soluble resins, including polyacrylic resins. In this regard, reaction between the polyacrylic resin and imine resin may be characterized whereby available carboxy groups of the acrylic compound react with the tertiary amino groups of the imine resin to form salts. In contradistinction, other plates have also employed polyacids such as polyacrylic acid, however, they were used alone as intermediate coatings in which case the only probable reaction would take place between the metallic surface and the carboxylic groups of acid. The surface was rendered somewhat hydrophilic, but polyacids alone failed to lengthen the useful life on the plate appreciably.

Still other plates have used monomeric organic acids such as acrylic acid, methacrylic acid and their water soluble salts in conjunction with conventional amino resins such as urea and melamine formaldehyde resins. In this case, two bath stations are required in the coating process wherein the amino resin would first be applied to the support plate and then the monomeric acid applied by means of a second bath. An in-situ reaction would occur on the plate whereby the amino resin layer and the acid layer react, the former acting at the ethylenic linkage of the acid. This type of plate has been less than satisfactory, not just because of toxicity, odors and added production costs resulting from additional coating steps, but also by reason of its relatively brief shelf-life and storage properties as well as possible scumming tendencies. The abbreviated shelf-life of such plate may be attributed to the use of conventional, less stable amino resins as intermediate coatings.

Accordingly, it is a principal object of this invention to provide a series of novel polymeric compositions for coating preconditioned metallic support plates.

Another principal object of the present invention is to provide a method of use whereby polymeric compositions are applied to metallic plates as top-coat layers by a single-bath process.

It is still another principal object to provide an unusually durable, long running planographic plate comprising a preconditioned support member coated with an intermediate top-coat or subbase layer comprising novel polymeric compositions.

It is a further object to provide presensitized and wipe-on photolithographic plates having substantially improved wearing qualities comprising an anodized aluminum plate, an intermediate coating, and a final coating of a photo-sensitive material.

A still further object of the present invention is to provide a photolithographic plate which has a greatly extended shelf-life.

These and other objects, features and advantages of this invention will become apparent to those skilled in the art after a reading of the following more detailed description.

SUMMARY OF THE INVENTION

As previously indicated, a preconditioned metallic support member is coated with an intermediate top-coat layer which is the product resulting from the reaction of a polyalkylenimine-urea-aldehyde resin and a polyacrylic resin. The former resin has been described in detail in copending application Ser. No. 69,146, filed on Sept. 2, 1970.

Polyalkylenimine-urea-aldehyde resins described in the above copending application may be characterized as a group of stable, highly branched, tertiary-amine cationic polymers which are readily soluble in water. They are prepared by reacting a solution of a urea and a polyalkylenimine. The urea solution may include in addition to urea, mono-substituted lower alkyl ureas such as methyl, ethyl and propyl. It is ordinarily used as a 1:1 solution of water and urea. The polyalkylenimine reactant found most appropriate in the reaction are polyethylenimine and polypropylenimine. These imine polymers as starting materials are derived from the polymerization of their corresponding alkylenimines in the presence of an acid catalyst which causes a ring opening. Polyalkylenimines used in the reaction may be represented by the general formula:

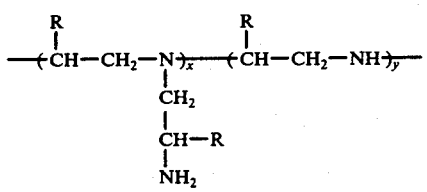

where R is hydrogen or lower alkyl, $x$ is branched tertiary alkylenimine and $y$ is secondary alkylenimine.

The illustrated polyalkylenimines can be further characterized as possessing primary, secondary and tertiary nitrogens in a ratio of 1:2:1 and a molecular weight of from 500 to 20,000 and preferably from 600 to 2,000.

Polyalkylenimine and urea react under heat and reflux to form a polyurea. The amount of urea added to the reaction vessel should be in the range of from 0.1 to 1.5 moles per each primary and secondary amine equivalent site on the polyalkylenimine. When heated to 170° to 200° F. under reflux the reaction is allowed to proceed only to the point where 10 to 30% polyurea forms and preferably about 10%. Under vacuum the mass is stripped to 80 to 95% solids and ammonia and water are distilled off. During this stage, additional water may be added to bring the mixture to 65 to 70% solids and distillation continued until a clear polyurea is formed having a medium viscosity of from 1000 to 2000 cps at 120° F. and a pH of 8.5 to 10.5.

The temperature of the reaction mass containing the polyurea is lowered to about 120° to 160° F. and additional urea is added in the range from about 0.2 to 1.3 moles per each primary and secondary amine equivalent site on the polyalkylenimine.

After cooling to about 100° to 130° F. the polyurea is methylolated by adding thereto a methylolating amount of a solution of an aldehyde to form methylolated polyurea amine. Although formaldehyde solutions such as formalin are preferred, virtually any readily available aldehyde like acetaldehyde may be used. From about 0.6 to 1.8 moles of aldehyde per each primary and secondary amine equivalent site on the polyalkylenimine should be added while agitating the mixture. The reaction mass is then refluxed at a temperature of from 170° to 200° F. until free aldehyde in the mixture is less than 1.5% and total solids range from about 50 to 65%. The mixture is diluted with water to about 20 to 40% solids, however, compositions of up to 65% solids can be used. The pH is ordinarily adjusted to about neutral with an organic acid such as formic, acetic, or citric acid. The resulting product is a highly stable, water-soluble polyalkylenimine-urea-aldehyde cationic resin having numerous branched tertiary amine groups.

Also included within the meaning of polyalkylenimine-urea-aldehyde resins for use in the present invention are those polymers which have been modified with a nitrogen containing material selected from the group consisting of melamine, benzoguanamine and dodecylaminopropylamine, also disclosed in the above cited copending application. The nitrogen containing variations are easily prepared by incorporating into the reaction mass a sufficient amount of the above specified compounds either with the the second batch of urea or optionally, after methylolation.

The second reactant necessary for preparing useful compositions of the present invention is a polyacrylic resin. In this regard, the polyacrylic resin is preferably one having amide and/or carboxyl groups and is a water soluble polymer having a molecular weight of from 10,000 to 200,000. Included within the term polyacrylic resin are polymers of acrylamide, hydrolyzed acrylamide, acrylic acid, and salts thereof.

Acrylic acid polymers for use in the instant invention are well known resins and can be prepared either by solution or bulk polymerization of the monomer. In the latter case, for example, polyacrylic acid can be prepared by warming acrylic acid in the presence of a peroxide catalyst such as benzoyl peroxide. Solution polymerization may be completed by heating the aqueous monomer in the presence of an initiator, such as hydrogen or acetyl peroxide or initiating redox polymerization at reduced temperature in the presence of potassium persulfate and sodium thiosulfate. One commercially available polyacrylic acid suitable for the disclosed purpose is manufactured by Rohm and Haas under the Trademark "Acrysol A-1."

In addition to polyacrylic acid, it has also been found that water-soluble homologues of polyacrylic acid may also be used. For example, polymethacrylic acid when reacted with the imine resin gives a durable, hydrophilic surface throughout the life of the printing plate.

Salts of polyacrylic acid can also be used in a like manner. For instance, neutralization of homopolymers of acrylic acid units can be carried out by alkaline hydrolysis using organic and inorganic bases such as sodium and potassium hydroxide to produce soluble products. These salts are also to be considered the full equivalents of the free acid polymers for the purposes of this invention.

Other water soluble acrylic resins found useful in the present invention are numerous polymers of acrylamide which includes both homopolymers and copolymers. One example is polyacrylamide which may be prepared by solution methods where acrylamide is polymerized in aqueous medium with the use of an initiator, such as potassium persulfate, at 60° to 100° C. This method has been described in U.S. Pat. No. 2,983,717. Alternatively, polyacrylamide can be prepared by carrying out the reaction in methanol with azobisisobutyronitrile as the initiator at a temperature of 50° to 100° C. Copolymers of acrylamide with acrylic acid can also be prepared by the methods outlined above.

Other water soluble polyacrylic resins found particularly useful are the hydrolyzed acrylamide polymers. Polymers of acrylamide can be produced in which 10 to 70% of the amide groups initially present are converted into alkali metal carboxylate groups. U.S. Pat. No. 2,886,558 describes a process for their preparation. Hydrolyzed polyacrylamides are commercially available under the Trademarks "Cyanamer-A370" and "Cyanamer-P-26" by American Cyanamid.

In preparing the reactants in certain cases, it may be necessary to dilute the polyacrylic resin with an aqueous solution to lower its viscosity. Ordinarily the polyacrylic resin solution is used in a concentration of up to 20% and advantageously at about 5 to 10% by weight.

In preparing useful reaction products suitable for application to lithographic plates from a single aqueous bath, solutions of each of the above mentioned ingredients are mixed together at ambient temperature until a clear homogeneous product results. During this process step it is also beneficial to add a small amount of an aldehyde such as formaldehyde, formalin, or acetaldehyde. However, the addition of an aldehyde to the reaction mixture is optional and is not necessary in every instance.

To assure optimal effect when applied to metallic substrates the proportional range of polyalkylenimine-urea-aldehyde resin, polyacrylic resin and aldehyde should be used in a ratio of about 10:3:1 respectively. Although this ratio is definitive of preferred amounts of each reactant, good results can be assured when the imine resin is used in an amount from 0.05 to 20% by weight based upon the total weight of the reaction mass and more specifically at about 0.01 to 4% by weight will give effective results and advantageously in the range from 0.1 to 1% by weight. The aldehyde, if used, may also be present generally from about 0.0005 to 2% and more particularly at about 0.05 to 0.5% by weight based upon the total weight of the reaction mixture.

Before the intermediate coating is applied, the support member, either alloy, sheet or plate is optionally but preferably grained, etched and anodized, in the case of aluminum. However, the metallic support or plate is not limited only to aluminum, but may also include zinc, copper, tin, lead, chromium, magnesium, and steel base members. Importantly, it should be noted that favorable results can be obtained regardless whether the plate is grained or ungrained prior to anodizing. Moreover, anodic oxide coatings can be omitted entirely, in which case the plate member is grained by conventional methods, either by ball, brush or sandblasting techniques.

Although chemical etching is preferred in most instances for the purpose of avoiding the formation of smut on the surface of the plate, it too may be eliminated from the process. However, chemical etching in a bath containing alkali metal hydroxide such as sodium, potassium or lithium hydroxide provides a bright clean plate free of any streaks after anodizing. When etching is dispensed with, it is suggested that the plate be cleaned in a solution of nitric acid.

As indicated above, most favorable, longest running plates are made of aluminum which have been grained, etched, and anodized. In this regard, the aluminum can range from 0.0005 to 0.025 inch in thickness and may consist of any acceptable alloy such as 1100 grade, 3003 and 5052 alloys. In processing, the plates are handled either as a continuous web or as individually coated sheets.

In actual processing, after the plate is cleaned and optionally grained, it is then anodized to anodic coating thicknesses from 0.005 mil to 1.0 mil and preferably from about 0.01 mil to 0.1 mil. Any appropriate anodizing procedure may be used, as long as reasonably uniform anodic coatings are formed with acceptable hardnesses and porosity. A great number of techniques for plate anodization are available, and specific parameters of current density, voltage, electrolyte concentration, electrolyte compositions and bath temperatures can be varied as long as an acceptable plate is produced. Table I below illustrates only a few suitable variations in time, current, etc. for anodizing aluminum plates in a 15% sulfuric acid bath.

TABLE I

| Alkaline Etch Before Anodizing | Anodizing Time in Minutes | Thickness of Anodized Coatings in mils | Current Density amperes per sq. ft. | Temperature of Anodizing Bath ° F. | Number of Impressions To Image Failure, 20% Dot | |
|---|---|---|---|---|---|---|
| | | | | | 300 Line Screen | 150 Line Screen |
| No | 5.3 | 0.08 | 12 | 70 | 76,000 | 95,000+ |
| No | 3.3 | 0.05 | 12 | 70 | 76,000 | 95,000+ |
| No | 1.3 | 0.02 | 12 | 70 | 53,000 | 85,000 |
| Yes | 5.3 | 0.08 | 12 | 70 | 95,000+ | 95,000+ |
| Yes | 3.3 | 0.05 | 12 | 70 | 95,000+ | 95,000+ |
| Yes | 1.3 | 0.02 | 12 | 70 | 95,000+ | 95,000+ |
| No | 3.3 | 0.05 | 12 | 80 | 88,000 | 95,000+ |
| Yes | 3.3 | 0.05 | 12 | 80 | 86,000 | 95,000 |

After the metallic support member has been grained for grained and anodized in the case of aluminum plates, the intermediate subbase coatings reaction product described above is then applied thereto. This coating is ordinarily applied by spraying or by immersing in a single aqueous bath solution having a pH of about 5 to 10 and at a temperature of between 50° and 100° F. There are no special requirements as to density or thickness of the intermediate subbase coat, as long as a sufficient amount is used to coat the support plate. The resin coating may or may not seal the underlying anodic coating or metal surface and do not wish to be held to any specific mechanism of sealing, but are merely describing a coating system that may function as a filler or sealer and as a hydrophilic coating. However, it is preferred that the aluminum oxide coat remain unsealed. But, above all, the coating is adsorbed by the porous metal surface, thereby providing a hydrophilic surface that remains water receptive throughout the life of the printing plate.

Subsequently, the plate is dried by any available heat source in order to expel moisture which might be remaining on the plate, and furthermore, to accelerate the curing of the subbase coating.

In the case of presensitized plates, a photopolymer or light sensitive polymer is then applied to this intermediate coating which may include virtually any light sensitive material such as the various diazo resins described in the above mentioned patent to Jewett et al. Also included are the well known cinnamate, acrylate, and alkyl photopolymers as well as other related photopolymers with appropriate activators, dyes or pigments if necessary.

After coating with the light sensitive polymer the plate is dried and ready for packaging and use. Test runs have shown the plate made according to the present invention to be extremely durable and capable of extended press runs not experienced with prior art plates prepared either with silicate, polyacid subbase coatings, or subbases consisting of conventional amino resin-organic acid combinations.

The following examples illustrate some of the embodiments of this invention. It is to be understood that these are for illustrative purposes only and do not purport to be wholly definitive as to conditions and scope.

EXAMPLE I

To a single reaction vessel, 658 pounds of polyethylenimine having a molecular weight of 1200 is added, which is preheated to 110° to 130° F. to lower its viscosity. Stirring is provided by a motor-driven anchor agitator.

The reaction vessel is then charged with a premixed solution of water and 790 pounds of urea (1:1 ratio by weight) and heated to 140° F. The entire mass is then mixed and heated to 185° F. and refluxed for one hour. During this process, vacuum is applied (20–26 in. Hg) and the mixture stripped to 90% solids. Additional water is then added to bring the mixture to 70% solids. Ammonia and water continues to distill off.

The reaction mass attains a pH of about 9.6 and is a clear, medium viscosity polyurea. The temperature is maintained at 140° F. and a second batch of urea (830 pounds) is added to the vessel, which is then cooled to 115° F.

Slowly with agitation, 2,950 pounds of formalin (37% formaldehyde) is incorporated into the polyurea which is then refluxed for 4 hours until the remaining formaldehyde is less than 1.5%. The resinous mixture is cooled below 100° F. and diluted to 30% solids with water. The pH is adjusted to about 8 using formic acid, and filtered.

The resulting clear, dark red-down resin is analyzed and should have a solids content of 30%, specific gravity 1.099, and a viscosity of 6–10 cps at 25° C.

EXAMPLE II

A 500 ml reaction flask was charged with 200 grams of the resin described in Example I. Ten grams of formalin and one gram of melamine was added and this slurry refluxed for 30 minutes at a pH of 8.0. All of the melamine was methylolated as evidenced by a clear solution.

EXAMPLE III

A bath solution was prepared by blending 12 ml of the material prepared in Example I with 36 ml of a 5% by weight solution of polyacrylamide having 76% carboxylate (sodium) groups. The solutions were mixed at room temperature until a clear solution resulted.

EXAMPLE IV

A bath solution was prepared by blending 12 ml of the material prepared in Example II with 36 ml of a 5% by weight solution of polyacrylamide having 70% carboxylate (sodium) groups. The solutions were mixed at room temperature until clear.

EXAMPLE V

Anodized Plate

Sixteen 1100 aluminum alloy sheets 20 × ⅜ × 0.009 inches were brush grained by passing through a two brush, brush graining machine using a slurry of 6/0 quartz, pumice and water. After graining, the plates were sprayed with water to remove the grit.

Some of the plates were etched by placing in an alkaline bath containing 5% sodium hydroxide at 140° F. for 5 seconds. Those plates which were not etched were in turn placed in a nitric acid solution containing 50% by volume of acid for 1 minute to desmut their surface and subsequently rinsed under cold tap water.

The plates were then anodized. The procedure required two sheets placed back-to-back to be anodized for 30 minutes at 12 amperes per square foot of grain area with a 15% sulfuric acid electrolyte. The grained plates, both etched and unetched, had an anodic oxide thickness of 0.45 mils as determined by using a Zeiss Light Section Microscope.

The anodized plates were subbased by spraying an aqueous solution containing the reaction product obtained from mixing 0.7% by weight of polyethylenimine-urea-formaldehyde resin made according to Example I with 0.2% by weight of hydrolyzed polyacrylamide (Cyanamer-A-370) and 0.2% by weight of formalin. The plates were then squeegeed, rinsed with water, squeegeed, rinsed with an aqueous lactic acid solution (pH 3.4), squeegeed, and then dried over a gas flame. The plates were then coated with a 3.5% solution of a diazo resin consisting of 4-diazo diphenylamine and formaldehyde, available under the tradename "Diazo-Resin "#4" by Fairmost Chemical Company. After coating with the light sensitive material the plate is dried with a warm air stream.

Another series of anodized plates were also prepared using the same procedure, however, anodizing times were shortened to about 1 to 5 minutes to produce anodic coatings within the preferred range from about 0.01 mil to 0.1 mil thickness. The plates were exposed with a pulsed xenon arc through a negative that displayed line work, 150 line screens (20% dot) and 300 line screens (20% dot). The exposed plates were developed with a black one-step developer and fitted on a Harris LUH sheet fed press equipped with a standard dampening system. Twenty pound bond paper and Van Son black ink was used for the tests. Table I above demonstrates the press test results.

EXAMPLE VI

Presensitized plates were prepared according to the procedure of Example V except ball grained aluminum plates were used to provide a more roughened surface.

EXAMPLE VII

Two aluminum sheets, alloy 1100-H26, 20 × 24 ⅜ × 0.009 inch were twice passed diagonally through a standard two nylon brush, brush graining system ring using a slurry of 6/0 quartz and pumice in water. After graining the plates were then secured back-to-back to an aluminum anode rack and immersed in an aqueous anodizing solution containing 165.3 gm. of sulfuric acid per liter of solution. The temperature of the bath was maintained at 70° F. ± ¼° F.

A control-ungrained aluminum 1100 alloy (1 × 1 foot; total surface area 2 sq. ft.) was connected electrically in parallel to the grained plates and in series to an ammeter. Current adjustment was made so the ammeter read 24 amperes. This procedure insured a current density of 12 amperes per square foot of grained surface. The plates were anodized for 13.3 minutes in order to obtain 0.2 mil of anodic coating. The samples, after anodizing were rinsed in cold tap water and the spray rinsed with deionized water and dried on a stream table.

One group of plates were immersed for a few seconds in a solution containing 15 gallons of a sodium silicate solution per 50 gallons of water (180° to 190° F.). The plates were rinsed in cold tap water and squeeged to remove excess water and then flame dried.

The other group of plates were treated with a composition comprising the reaction product of polyethylenimine-urea-formaldehyde-polyacrylamide as shown in Example V.

The plates were dried and sensitized with "Diazo Resin "#4," 3.5% by weight. These plates were then exposed to pulsed xenon arc light through a 150/300 line screen negative until a solid 6 was obtained on the GATF Sensitivity Guide. After exposure, the plates were developed using a standard black one-step developer and placed on a LUH press equipped with a standard dampening system. Table II shows the number of impressions to image failure.

TABLE II

| Plate | Plate Grain | Anodic Coat Thickness (mils) | Sealant | Subbase | Impressions to Failure 300 Screen | 150 Screen |
|---|---|---|---|---|---|---|
| 1 | Brush | .4 | Silicate | Silicate | 21,000 | 30,000 |
| 2 | Ball | .4 | Silicate | Silicate | 28,000 | 47,000 |
| 3 | Brush | .2 | Silicate | Silicate | 18,000 | 23,000 |
| 4 | Brush | .2 | — | Polyalkylenimine polyacrylic resin reaction product | 88,000 | 100,000+ |

Table II aptly demonstrates the superior performance provided by subbase coatings of the present invention.

While the invention has been described in conjunction with specific examples thereof, this is illustrative only. Accordingly, many alternatives, modifications and variations will be apparent to those skilled in the art in light of the foregoing description, and it is therefore intended to embrace all such alternatives, modifications and variations as to fail within the spirit and broad scope of the appended claims.

We claim:

1. A subbase coating composition for photolithographic plates comprising a salt formed from the reaction product of a water soluble polyacrylic resin containing carboxy groupings and a polyalkylenimine-urea-aldehyde resin, said polyacrylic resin being selected from the group consisting of polymers of acrylamide, hydrolyzed acrylamide, acrylic acids and salts thereof, and having a molecular weight range of from 10,000 to 200,000, wherein said polyalkylenimine-urea-aldehyde resin is a product made according to a process which comprises the steps of:
   a. heating and reacting a polyalkylenimine resin having the following general formula:

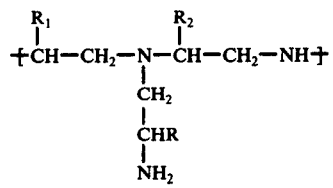

wherein $R_1$ and $R_2$ are alike or different and are selected from the group consisting of hydrogen, lower alkyl, water and urea to form from about 10 to about 30 percent of a polyurea reaction product, while water and ammonia are removed;
   b. adding thereto and reacting additional urea;
   c. methylolating the reaction mixture with an aldehyde to form said polyalkylenimine-urea-aldehyde resin;

wherein said salt is characterized by the reaction of carboxy groups of said polyacrylic resin with the tertiary amino groups of the polyalkylenimine resin.

2. The composition of claim 1 wherein the polyalkylenimine-urea-aldehyde resin is a polyethyleniminie-urea-formaldehyde resin.

3. The composition of claim 1 wherein the polyalkylenimine resin has a molecular weight of from 500 to 20,000.

4. The composition of claim 1 wherein the polyalkylenimine resin has a molecular weight of from 600 to 2,000.

5. The composition of claim 1 wherein the polyalkylenimine resin is polyethylenimine or polypropylenimine.

6. The composition of claim 1 wherein urea is reacted with the polyalkylenimine.

7. The composition of claim 1 wherein a nitrogen containing material selected from the group consisting of melamine, benzoguanamine and dodecylaminopropylamine is included in the reaction mass with the additional urea.

8. The composition of claim 7 wherein the nitrogen containing material is added to the reaction mass after methylolation.

* * * * *